July 15, 1941.  J. L. MICHAELSON  2,249,483
LIGHT INDICATING APPARATUS
Filed Nov. 30, 1939
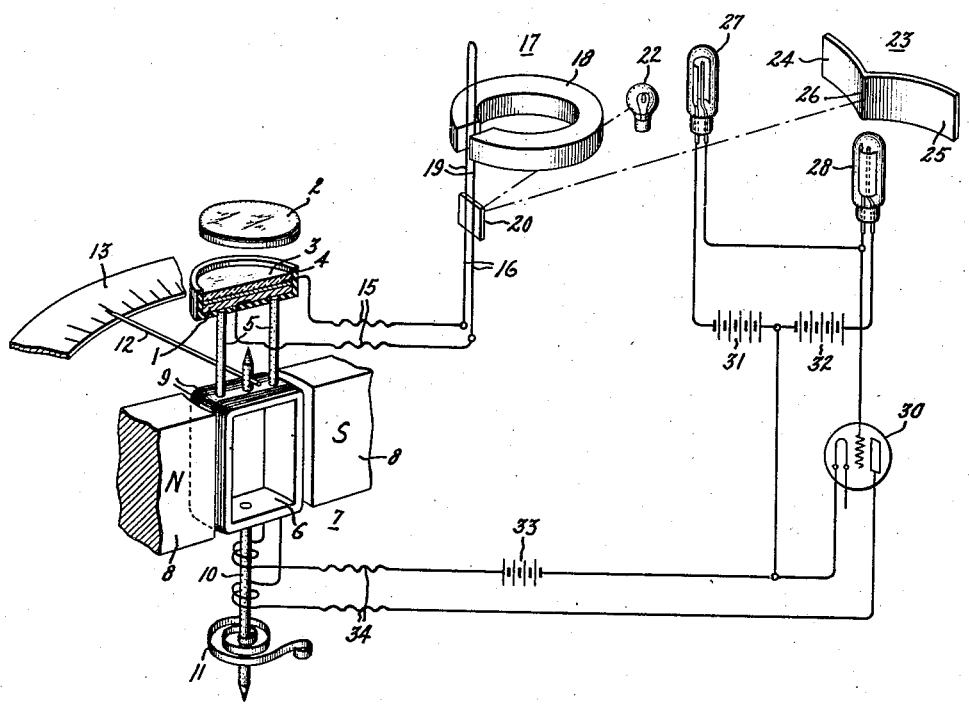
Inventor:
Jesse L. Michaelson,
by Harry E. Dunham
His Attorney.

Patented July 15, 1941

2,249,483

UNITED STATES PATENT OFFICE 2,249,483

LIGHT INDICATING APPARATUS

Jesse L. Michaelson, Schenectady, N. Y., assignor to General Electric Company, a corporation of New York Application November 30, 1939, Serial No. 306,917

2 Claims. (Cl. 88—23)

My invention relates to apparatus for indicating a light intensity such as the amount of illumination at a certain location and particularly to that type of apparatus which employs a photoelectric device arranged to receive the light and a galvanometer connected to respond thereto.

One object of my invention is the provision of improved apparatus of this type wherein the amount of light which reaches the photoelectric device is maintained constant thereby increasing the life of the device and the accuracy of the apparatus. Another object is the provision of such apparatus wherein the deflection of the galvanometer is approximately constant whereby the accuracy of that element is increased.

My invention will be better understood from the following description taken in connection with the accompanying drawing and its scope will be pointed out in the appended claims.

In the single figure of the drawing which is a combined perspective view and circuit diagram of one embodiment of my invention, 1 represents a photoelectric device of the blocking layer or self generating type and arranged above this device in the path of light received thereby are the two relatively rotatable polarizing filters 2 and 3. In the form illustrated the filter 2 is supported in a fixed position, the supporting means being not shown, and the filter 3 is supported in a rotatable manner. The photoelectric device may be supported in fixed position or may be arranged to rotate with the rotatable filter 3, as desired. In the drawing I have shown the photoelectric device and the filter 3 mounted together in the shallow cup 4 which is supported by the rods 5 from the rotatable armature structure 6 of the instrument 7. This instrument includes the pole-pieces 8 between which the armature member 6 having thereon the winding 9 is mounted for rotative movement by the pivots 10. Attached to one pivot is shown the return coil spring 11 and attached to the other is the pointer 12 which is arranged to cooperate with the scale 13.

Connected with the terminals of the photoelectric device 1 through the flexible connections 15 is the moving element 16 of the reflecting galvanometer 17. This galvanometer may be of any desired form. It is shown by way of example as of the oscillograph type having the permanent magnet 18 between the poles of which extends the conducting loop 19 carrying the mirror 20. Light from a suitable source represented as the electric lamp 22 is reflected by the mirror 20 onto the double concave mirror 23. This mirror comprises the two concave portions 24 and 25 which have a junction edge represented at 26 arranged to receive the light beam reflected by the mirror 20 and in front of the portions 24 and 25 of the mirror 23 are the two photoelectric devices 27 and 28, such for example as photoelectric tubes, the device 27 being arranged to receive the beam reflected from all portions of the part 24 and the device 28 being arranged to receive the beam reflected from all portions of the part 25. The output of the devices 27 and 28 is amplified by the electron discharge amplifier 30, the devices being connected to the input circuit of this amplifier through the batteries 31 and 32 whereby light directed upon these two devices produce opposite charges on the grid of the amplifier. The output circuit of the amplifier connects through the battery 33 and the flexible connections 34 with the terminals of the winding on the armature member 6, the energization of which winding tends to rotate the armature member in a direction to increase the tension of the return spring 11.

Assuming that the plane of polarization of the filter 3 makes an angle with that of the filter 2 and that the intensity of the light reaching the photoelectric device through the filters is sufficient to cause a deflection of the galvanometer to the position illustrated with the beam engaging parts of both portions of the mirror then the energization of the armature 6 under the control of the amplifier will be that necessary to maintain the filter 3 in the position assumed. Should the amount of illumination decrease, then the decreased output from the device 1 will cause the galvanometer 17 to make a smaller deflection whereby the reflected light beam will be directed against more of the mirror portion 24 and against less of the portion 25. The photoelectric device 27 thereby will be excited greater than the device 28; hence the amplifier 30 by having its grid made more negative will decrease the current flow through the winding on the armature 6. Accordingly the filter 3 will be moved in a direction which will cause the plane of its polarization more nearly to correspond with that of the filter 2 thereby increasing the output of the device 1. The resulting increase in output of that device will cause the galvanometer mirror to return toward its original position covering the junction of the two portions of mirror 23 until the distribution of light between the two devices 27 and 28 is such that the amplifier holds the armature in a fixed position. Likewise, if the amount of light reaching the photoelectric device 1 is greater than that originally assumed then the effect of the galvanometer and the photoelectric devices is to increase the energization of the winding on the armature member 6 to cause the filter 3 to move in a direction to reduce the light reaching the device 1 until the output thereof is restored substantially to its original amount. At that time the amplifier holds the armature and filter 3 in a new fixed position.

It will be seen that as the armature member 6 varies its position, the pointer 12 carried thereby serves to indicate the amount of illumination, hence the scale 13 may be calibrated if desired in light units such as lumens. Moreover, if desired, the pointer and scale may be replaced by suitable recording means well known in the art by which a permanent record may be made of the movement of the armature member.

Inasmuch as the amount of light reaching the device 1 is automatically adjusted and maintained constant, the life of the device and the accuracy of the apparatus is increased. Furthermore, since the deflection of the galvanometer 17 is approximately constant, the accuracy of that element of the apparatus also is increased.

It is to be understood that by the use of the term "light" in the description and claims of this application, I do not wish to be limited to that part of the spectrum which is visible and is ordinarily spoken of as light. On the contrary, I employ the term "light" in the sense of any and all radiation, either visible or invisible, to which the photoelectric device employed is capable of making a response.

I have chosen the particular embodiment described above as illustrative of my invention, and it will be apparent that various other modifications may be made without departing from the spirit and scope of my invention which modifications I aim to cover by the appended claims.

What I claim as new and desire to secure by Letters Patent of the United States is:

1. Light indicating apparatus comprising a photoelectric device arranged to receive the light to be indicated, a plurality of light polarizing members arranged in the path of light received by said device, a biasing member tending to rotate one of said polarizing members in one direction, electromagnetic means for rotating said one member in the other direction, a light reflecting galvanometer connected to be energized by the output of said device, means responsive to a deflection of the light beam of said galvanometer greater or less than a predetermined amount for controlling the energization of said electromagnetic means and an indicator associated with said one polarizing member.

2. Light indicating apparatus comprising a photoelectric device arranged to receive the light to be indicated, a fixed and a rotatable polarizing member arranged in the path of light received by said device, an electromagnetic device having a rotatable member supporting said rotatable polarizing member and said photoelectric device, a reflecting galvanometer connected to be energized by the output from said photoelectric device, means comprising other photoelectric apparatus responsive to the deflection of said galvanometer for controlling the energization of said electromagnetic device to produce rotation of said rotatable member and means for indicating the deflection of said rotatable member.

JESSE L. MICHAELSON.